United States Patent [19]
Miller

[11] 4,003,050
[45] Jan. 11, 1977

[54] FULL RANGE CORRELATOR FOR USE IN A COLLISION AVOIDANCE SYSTEM

[75] Inventor: Jeffrey Ellis Miller, Dallas, Tex.

[73] Assignee: RCA Corporation, New York, N.Y.

[22] Filed: Apr. 21, 1975

[21] Appl. No.: 569,995

[30] Foreign Application Priority Data

Apr. 23, 1974 United Kingdom ............. 17707/74

[52] U.S. Cl. .................. 343/7.3; 343/6.5 LC; 343/5 DP
[51] Int. Cl.² ............................................... G01S 9/56
[58] Field of Search ........... 343/6.5 R, 6.5 LC, 7.3, 343/5 DP

[56] References Cited
UNITED STATES PATENTS

| | | | |
|---|---|---|---|
| 3,755,811 | 8/1973 | Breckmann | 343/6.5 R |
| 3,803,604 | 4/1974 | Case | 343/7.3 |
| 3,887,916 | 6/1975 | Goyer | 343/6.5 LC |
| 3,922,673 | 11/1975 | Bishop | 343/6.5 LC |

Primary Examiner—Richard A. Farley
Assistant Examiner—S. C. Buczinski
Attorney, Agent, or Firm—Edward J. Norton; Joseph D. Lazar

[57] ABSTRACT

In a cooperative collision avoidance system, the reply signals to interrogation probe signals are correlated by a digital circuit that processes all the reply signals identifying targets over non-targets or "fruit." The correlator is capable of detecting all targets in any desired range during a given correlation period.

6 Claims, 3 Drawing Figures

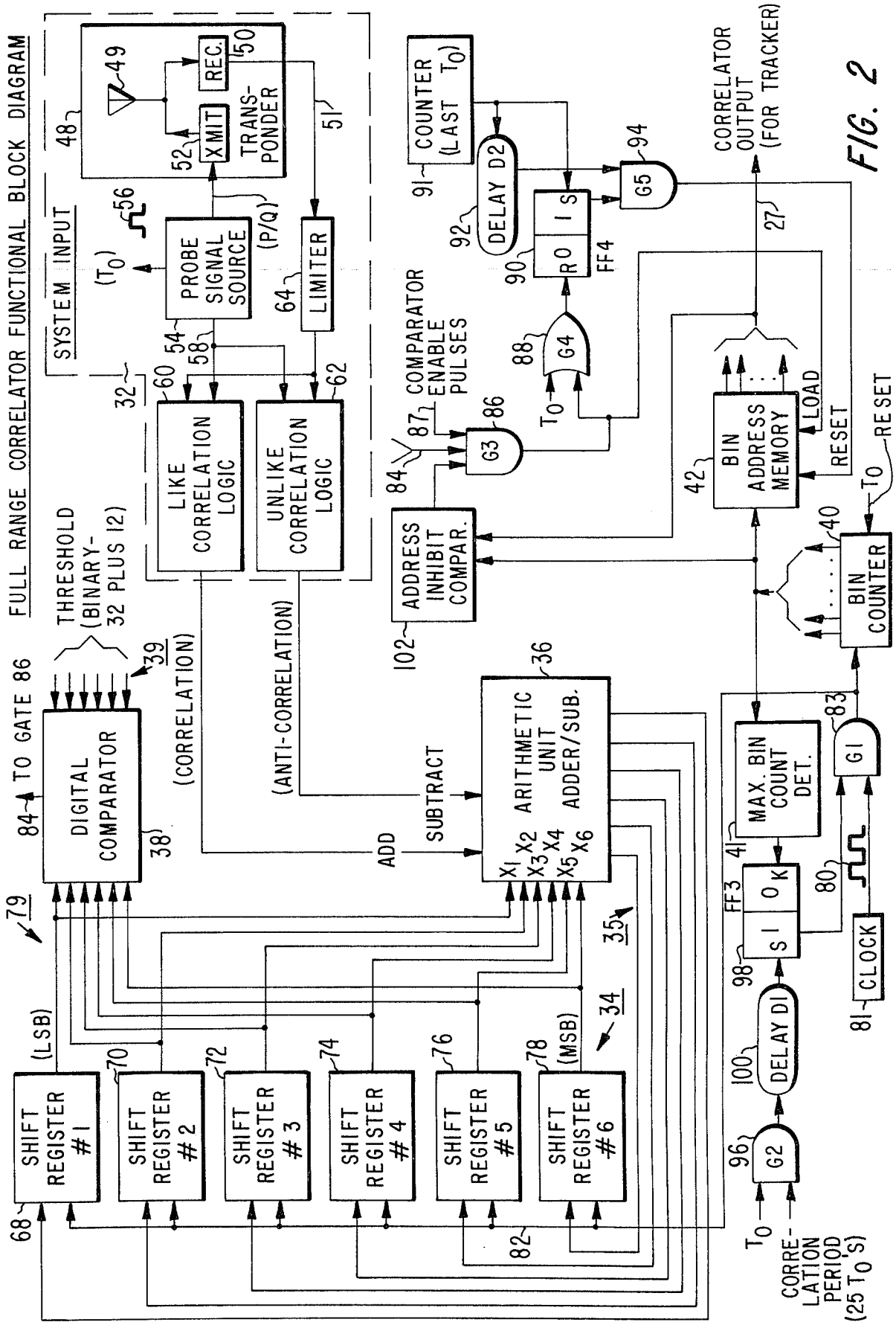

FULL RANGE CORRELATOR FOR USE IN A COLLISION AVOIDANCE SYSTEM

CROSS REFERENCE TO RELATED APPLICATIONS

Of interest are the following copending patent applications: Ser. No. 355,448, filed Apr. 30, 1973, entitled "Correlator and Control System for Vehicular Collision Avoidance," based on the invention of R. B. Goyer now Pat. No. 3,887,916; Ser. No. 462,491, filed Apr. 19, 1974, entitled "Altitude Coding for Collision Avoidance System," based on the invention of J. J. Lyon now U.S. Pat. No. 3,947,845, issued Mar. 30, 1976; Ser. No. 553,122, filed Feb. 26, 1975, entitled "Tracking Gate Servoed by Relative Range," based on the invention of J. E. Miller, all of which patent applications being assigned to the same assignee as the assignee of the present patent application.

BACKGROUND OF THE INVENTION

1. Field of the Invention

This invention relates to a correlator and control circuit for a vehicle to process signals useful in a vehicular collision avoidance system, more particularly, of the SECANT type for aircraft.

2. Description of the Prior Art

Collision avoidance systems have been proposed as means of preventing collisions by vehicles both of the maritime vessel type and of the airborne type. Cooperative systems of the asynchronous type include interrogator-transponder techniques in which interrogation signals or probes are transmitted from one vehicle on a random basis. Vehicles in the vicinity receiving such probes respond with signals of various indicia to provide to the interrogation vessel information relating to both range and information identifying the vessel and its position. In airborne systems such information may include the relative or actual altitude of the aircraft.

An existing collision avoidance system known by the acronym SECANT (Separation Control of Aircraft by NonSynchronous Techniques) employs probes identified by any one of a plurality of frequencies and replies using different frequencies of the same band but arranged into a predetermined correspondence to a particular probe frequency. Special correlation techniques separate the true reply from other signals which may be probes from remote vessels generally identified as "fruit." Such a system is described in U.S. Pat. No. 3,755,811 issued Aug. 28, 1973, and 3,803,608 issued Apr. 9, 1974, based on the inventions of Jack Breckman.

A variation of the SECANT system known by the acronym VECAS (Vertical Escape Collision Avoidance System) employs the basic principles of the SECANT feature incorporating the discriminant for identifying and tracking targets based on relative altitudes of the interrogating (or transponding) and replying aircraft. For such a system, altitude information is provided with a sequential series of the reply signals in accordance with the system described in the above-identified patent application, Ser. No. 462,491, filed Apr. 19, 1974, entitled "Altitude Coding for Collision Avoidance System," based on the invention of J. J. Lyon now the aformentioned U.S. Pat. No. 3,947,845.

SUMMARY OF THE INVENTION

According to the present invention, a correlator periodically samples digital signals representing replies to probe signals, between cooperative vehicles, accumulates in sequential storage means having a plurality of bins each bin corresponding to a finite rage interval, a binary number representing the total number of replies received in each bin after a predetermined number of probes, and periodically compares the accumulated total number of replies to determine or identify remote vehicles having a range less than a predetermined critical or threshold value. The range interval corresponds to one or more targets which are then transferred or handed-off to a range tracker.

DESCRIPTION OF THE DRAWING

FIG. 2 is a logic diagram of the full range correlator according to the present invention.

DESCRIPTION OF A PREFERRED EMBODIMENT

Figure 1:
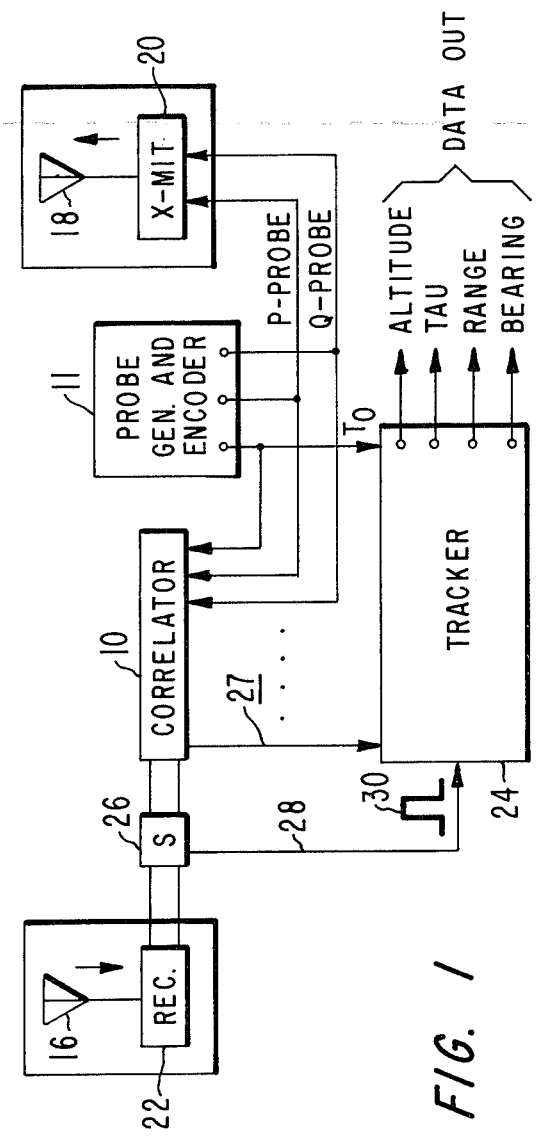
FIG. 1 is a simplified block diagram showing how the correlator according to the present invention cooperates with other system components of a typical collision avoidance system.

FIG. 1 is a diagram illustrating the correlator 10 of the present invention cooperating with a receiver 22 and transmitter 20, each associated with an antenna 16 and 18, which may be a common antenna suitably arranged with switching controls to provide for the transmit and receive functions. Further, the antenna arrangement may include antennas situated above and below the aircraft to provide altitude coverage in zones above and below the aircraft. Such arrangements are discussed in more detail in the above-identified application, Ser. No. 462,491, filed Apr. 19, 1974, entitled "Altitude Coding for Collision Avoidance System," based on the invention of J. J. Lyon now the aforementioned U.S. Pat. No. 3,947,845. The correlator, in general, operating as described in the above-identified application of R. Goyer U.S. Pat. No. 355,448, now U.S. Pat. No. 3,887,916, issued June 3, 1975 provides in a cooperative system a probe encoder 11 which generates interrogation or probe signals designated as P and Q. The signals are converted from D.C. to video form and transmitted through the transmitter 20 to the transmitting antenna 18. Signals received through the receiver 22 via antenna 16 are processed through the receiver 22 to the correlator 10 and arranged to be coupled to a tracker 24 via switch 26 over path 28. A suitable tracker is described in U.S. Pat. No. 3,803,604 issued on Apr. 9, 1974, to Bernard Case. The correlator processes received signals and correlates on a statistical basis the probe signals with the received signals to identify true replies from random or nonreplies, identified herein as "fruit."

The P or Q signals are transmitted at about 1,000 times per second with a 1 microsecond pulse width. The probed aircraft returns a reply substantially instantaneously in response to the reception of the interrogation pulse, the reply signal also being of a 1 microsecond pulse width. The reply signals may be encoded to provide a sequential series of either a logical 1 or 0 for each bit of a message providing identification of the replying aircraft and its altitude.

The correlator functions to identify targets of threatening range and "hands-over" that target via control leads 27 to the tracker. The tracker then follows or tracks the return target signal 30 computing from that signal the range, time to potential collision known as tau, the altitude and the relative bearing of the target that is being tracked.

Referring now to FIG. 2, a logic diagram of a correlator according to the present invention is shown. In general, the correlator functions to assign a value corresponding to the amount of signal that is present at consecutive intervals of time. The signals are correlated over a full time domain of interest and determines, based upon a preset but variable threshold value in the time interval, the correlated signal sources (targets or hits) located or identified. This correlator is useful in any system in which a probe signal is related to replies whether the replies are caused by a target transponder or by a target echo. When used in conjunction with a target tracking system, the time intervals represent increments of radar range commonly referred to as "bins." The first bin starts at the time of the interrogation transmission. A typical bin width may be 1 microsecond which corresponds in radar technology to about 500 feet of range. Such a bin width is that which is used in the SECANT and SECANT/VECAS collision avoidance systems. For use with maritime vessels the bin width is preferably 250 nanoseconds which is approximately 40 yards or 120 feet. The number of consecutive bins that are to be selected depends upon the maximum tracking range that is desired.

The novelty of the present correlator resides in sequential storage devices such as shift registers and the associated control circuitry.

Before proceeding to a detailed description of the circuit arrangement shown in FIG. 2, an overall description of the invention will be given. According to the present invention, the "full range" correlator samples, following each interrogation probe in a correlation cycle, digital signals representing replies to probe signals and processes them through an arrangement of sequential storage devices such as shift registers. The term "full range" correlator, as will be explained more fully hereinafter, covers a correlator that for each cycle of operation sweeps the entire desired range of interest and for each such cycle, all the replies representing potential vehicles of interest are stored or otherwise processed. A selected number of cycles will define a correlation period. The logical values (1 or 0) stored in corresponding stages of the shift registers are collectively arranged to form single binary numbers. The shift registers are simultaneously clocked at one frequency, the period of which is equivalent to a small interval of range, typically 500 feet for an airborne system and 120 feet for a seaborne system. The logical value (1 to 0) stored in the last stage of each of all the shift registers taken collectively in parallel forms a binary number whose value equals the number of replies in a particular range interval in response to received probes transmitted during each correlation period. At the end of the first shift register clock pulse, occurring a short delay after each probe pulse ($T_o$ pulse), the binary number in the last shift register stages represents the replies received during the first range interval (or bin) for all previous probes of the present correlation period. This number is coupled to an arithmetic unit where a 1 will be added to or subtracted from the number depending upon whether or not a proper (correlated) reply was received (i.e. in the SECANT system, a P type reply in response to a P type probe, a Q type reply in response to a Q type probe, where P and Q are represented by different frequencies). If no reply was received, a 0 will be added to the number. This addition (+1, −1, or 0) will be accomplished prior to the start of the second clock pulse. The second clock pulse will recirculate the summed output of the arithmetic unit back into the first stages of the shift register arrangement, while the contents of the next to the last stages are shifted into the last stages to generate a second binary number for the second range interval and coupled to the arithmetic unit. This shifting/adding process continues until all range intervals have been presented to the arithmetic unit. At the start of the next probe the process repeats and continues to repeat for each probe transmitted during the correlation period, typically covering 25 probes.

A digital comparator is preferably coupled to the output of the shift registers or, if desired, to the output of the arithmetic unit. During the last probe of the correlation period, the comparator generates a pulse each time the arithmetic unit input or the shift register output (representing the number of correlated replies received during the entire correlation period) exceeds a preset threshold. The range intervals corresponding to these comparator pulses correspond to one or more target locations and are handed-off to one or more trackers.

As just indicated, the shift registers are used to store a binary weighted value corresponding to the amount of the desired correlated signal in each bin. Presently available shift registers provide for relatively long bin lengths in a single integrated circuit package. Presently available typical shift register can accommodate 1,024 bins. In a SECANT/VECAS system, this is equivalent to approximately 85 miles which is quite adequate as the maximum ("full") range that is currently considered required for aircraft collision avoidance systems. The distance of 85 miles is determined on the calculation of 1,000 bins or bits each 500 feet divided by 5,280 feet per mile. Thus, during one correlation period, the present correlator can operate as will be explained over a full range of interest for each cycle and correlation period rather than a partial range sector without requiring complex circuitry or excessive components. Furthermore such shift registers cooperating with the other logical components of the correlator illustrated in FIG. 2 are especially compatible to MOS LSI fabrication techniques for a significant reduction in packaging the equipment and the power requirements to operate it.

Referring again to FIG. 2, the organization of the logical components arranged to implement the preferred embodiment of the invention is shown. The main components comprise system input 32, shift registers 34, an arithmetic unit 36, comparator 38, bin counter 40, and a bin address memory 42.

The system input 32 comprises the transponder, probe source, and correlation logic. The input signals to the full range correlator are generated by circuitry included in the system input responding to the probe and reply signals of a suitable form such as that disclosed in the above-identified copending patent application, Ser. No. 355,448. Generally there is provided a transponder 48 of any suitable arrangement comprising a receiver 50 and a transmitter 52. A preferred receiver is described in U.S. Pat. No. 3,848,191 issued Nov. 12, 1974. The transponder is arranged as desired to provide transmission and reply signals to and from upper and lower altitude zonal arrangement in aircraft. For maritime use such a feature is, of course, not used. A probe signal source 54 provides preferably random signals of the P and Q nature of any one of a plurality of preassigned frequencies for transmittal over antenna 49. A signal $T_o$ as indicated by waveform 56, (see also the timing chart shown in FIG. 3) is generated as a start timing signal for the interrogation or probe. This signal is used in the circuit for timing purposes as will be described. In order to provide like correlation and unlike correlation (or anticorrelation) of the probe signals with received signals, the source 54 provides signals over path 58 to like (60) and unlike (62) correlation logic of suitable form such as described in the above-mentioned application Ser. No. 355,448. Signals are received via antenna 49 and receiver 50 and are detected and limited by pulse shaping as by limiter 64, the output of which provides suitable logic signals to like logic 60 and unlike logic 62.

The correlator is provided with control timing signals to effect the required logic operation. The signal source 54 generates P and Q signals which are transmitted approximately once every millisecond. During the time following each probe transmission, signals are received which may be fruit, that is, signals that are not replies, as well as true replies. The signals are processed through logic element 60 and 62 to provide correlation signals and anti-or unlike correlation signals as the input for the arithmetic unit 36. These signals provide the "add" and "subtract" control signals to the arithmetic unit 36 as will be described.

The sequential storage device means are preferably shift registers 34 consisting of a plurality of parallel shift registers 68, 70, 72, 74, 76, and 78 each chosen to be of sufficient length to equal the number of bins required, and of quantity to provide a binary number to cover the maximum range of interest, as will be explained. Each of the shift registers 34 is clocked over bus 82 by clock pulses 80 from a source 81, gated through an AND gate 83. Clock 81 is suitably 10 MHz to provide a clock period of one microsecond for each bin. The final stage output of each shift register is coupled to arithmetic unit 36 as parallel inputs thereto. The arithmetic unit is preferably a six bit parallel adder. The output of adder 36 is coupled over bus leads 35 to the respective inputs of the shift registers 34. The shift register outputs are preferably coupled to the input of the digital comparator 38. Comparator 38 is suitably a six bit comparator. The reference for comparision is a threshold signal 39 of either fixed or of variable arrangement. At the end of the correlation period, the comparator will determine which bin has accumulated enough replies to exceed the threshold. The threshold is chosen so that whenever the number of replies will exceed it, a true target, not merely fruit, exists in that bin.

According to one form of the SECANT system the threshold value is selected to be the equivalent of the value 44. The six shift registers (68–78) provide a six bit binary number for a maximum mumber of 64 with the MSB in shift register 78. Instead of having a reference value of zero for the system, the number 32 is chosen as the reference to allow for "subtract" signals manifested by anti-correlation signal inputs to the arithmetic unit 36. Thus, more initial "subtract" signals than "add" signals will not cause erroneous registrations in the arithmetic unit 36. Further, according to studies made on the number of replies that would identify a target, it appears that for a system in which 25 probes are used for a correlation period, 12 replies will identify a target with a high degree of accuracy. Accordingly the sum of the value of 32 for a reference and the value of 12 for identification of a target is the basis for the threshold value of 44.

Nevertheless, it appears that with additional experience only 12 to 14 probes may be needed for a correlation period. If such a specification were adopted, the number of shift registers 34 could be reduced whereby the threshold signal value would also be reduced.

The threshold input signal 39 to comparator 38 is implemented in a predetermined fixed arrangement by suitable battery sources representing 1's and 0's of binary data. The comparator 38 generates an output signal over path 84, applied as one input to a three input AND gate 86. The output of AND gate 86 serves as the load control to the address memory 42 and an input to a two input OR gate 88, the other input of the gate being the $T_o$ signal 56. The output of OR gate 88 serves as the reset (R) to flip-flop 90, the set (S) input to which being the last $T_o$ signal in a given correlation period. The last probe ($T_o$) signal is suitably generated by counting the probes in a counter 91 until next to the last probe is received. This count will gate the last probe pulse to FF4 (90) and also be delayed through delay 92 and applied as one input to a two input AND gate 94. The delay of delay 92 is arranged to be greater than the maximum bin count, that is, the total number of bins in the shift registers 34 in the preferred embodiment being 1,024, as counted in bin counter 40 and detected in maximum bin count detector 41. This delay will prevent the bin address memory 42 from being reset until the last potential load pulse from gate 86 could be generated. The output of AND gate 94 serves as the reset for the address memory 42.

A two input AND gate 96 provides a set (S) signal to flip-flop 98 through a delay 100 suitably having a delay equivalent to the receiver/transmitter turn around time. AND gate 96 is activated by the combined input of the probe ($T_o$) signal 56 and the period control signal which is active or on throughout the correlation period from a suitable timer, not shown. Flip-flop 98 when set generates an input to two input AND gate 83, the other input of which is gated by clock 81 at the pulse rate of clock pulses 80. This is essentially the system clock source for the shift registers 34. The same clock source clocks bin counter 40 which provides a binary output of a range count represented by the clock rate which is started by each $T_o$ probe signal 56 indicating the start of each probe period. The output of bin counter 40 is applied to a bin address memory 42, suitably a RAM is when a load pulse is generated when (G3) gate 86 receives a threshold exceedance signal over path 84 from comparator 38. Counter 40 also applies the bin count to a maximum bin count detector 41 preset to the maximum capacity of the system, namely, that of the total number of bins of the shift registers 34. Thus, if any count exceeds the capacity of the shift registers 34 as manifested by the output of bin counter 40, detector 41 will reset flip-flop 98. Only a subsequent output from AND gate 96 will set 98 again. Simultaneously with the input to bin address memory 42, the range from bin counter 40 is applied to an address inhibit circuit suitably a comparator 102 which compares the output of bin address memory 42 with the range of counter 40. The output at each address of bin address memory 42 is the range of each bin in which a target has been identified by the correlation process. These outputs can be applied to a suitable number of trackers of the form as described in "Tracker" U.S. Pat. No. 3,803,604 as the respective outputs of the range counter during the target hand-off period. The output of memory 42 is compared to the output of bin counter 40 to generate an enable signal to one input of the three input (G3) AND gate 86 when the bin count exceeds the last bin handed off to the tracker via path 27 (see FIG. 1). AND gate 86 serves as the control gate indicating that a target has been correlated and to thereby cause the correlator to identify the range of that target by the load signal to memory 42 which is also passed through OR gate 88 to inhibit the resetting of the memory 42. Memory 42 is reset if no threshold exceedances are detected at the end of the correlation period. The comparator enable pulses over lead 87 to gate 86 are derived by delaying the basic clock by some suitable fraction of a clock period to avoid enabling the comparator 102 until after its input has been stabilized.

Figure 3:
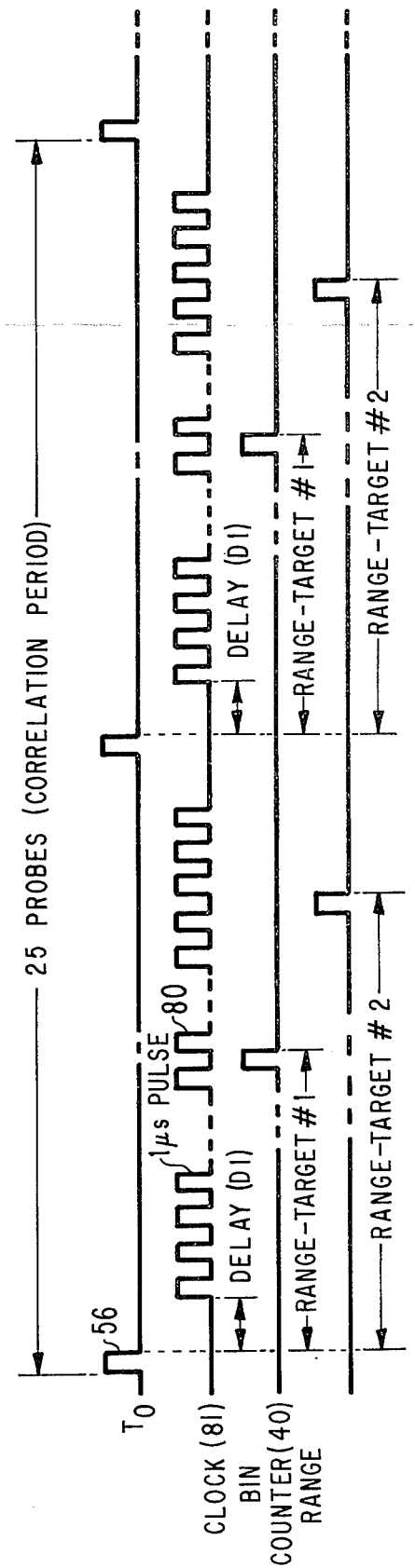
FIG. 3 is a timing chart showing several of the signals that are used or generated by the correlator.

In operation, the correlator will be understood in conjunction with the timing diagram illustrated in FIG. 3 of the several signals that are used or generated by the correlator.

In general, the range length in a time period is equal to the sampling period multiplied by the number of desired correlation probes in a correlation period. This as will be appreciated permits the full range of desired probes to be correlated in a shorter period of time than is possible by previous techniques comprising discrete bin registers or counters for segments of a total desired range. In the present arrangement, a train of clock pulses 80 drive the shift registers over bus 82. The burst of clock pulses 80 comprises a number which is equal to the number of bins as determined by the bin cunter 40 and the maximum bin counter detector 41. The period (one microsecond) of each clock pulse 80 is equal to the time interval of a bin.

The first clock pulse in each burst of clock pulses 80 occurs a fixed delay after the probe signal $T_o$ (56) triggers or starts an interrogation transmission. The delay is required to offset any transmission or transponding "dead time," the dead time being the time interval from the moment a probe reaches the remote transponder receiving antenna until the reply from the remote transponder leaves its transmitting antenna.

The last clock pulse in each burst of clock signals 80 represents the last bin of the shift registers 34 and thus the maximum range. Each shift register bit, thus, represents a unique bin of 1 microsecond wide or 500 feet for an airborne correlator.

The burst of clock pulses 80 is repeated for every $T_o$ probe signal during the correlation period as generated by gate 96 through delay 100 (the delay mentioned above to offset the dead time), flip-flop 98 and gate 83. Twenty-five consecutive $T_o$ pulses (probes) are preferably assigned as a correlation period according to a preferred embodiment as discussed above. It will be appreciated that the system covers thus an interrogation or correlation period of 25 milliseconds each. The present embodiment illustrated in FIG. 2 is capable of handling 32 $T_o$ probes since the largest binary number that can be represented by the six shift registers 34 is ± 31. Longer correlation periods, of course, would require additional shift registers than the six shift registers chosen for shift registers 34 as discussed above.

The inputs of the respective shift registers 68–78 are derived by adding or subtracting one (logical 1) to the binary weighted number represented by the shift register outputs over output conductors 79. This number, as has been previously indicated, is the bin value. The output of shift register 68, the first shift register of the group of shift registers 34, represents the least significant bit (LSB) of the bin value. Whenever a correlated signal from logic 60 exists at a particular bin time interval, a one is added to the bin value in the arithmetic unit 36 via the "like" correlation. When an anticorrelated signal such as a wrong frequency signal in SE-CANT received over the antenna 49, is detected by unlike logic 62, a subtract signal is applied to unit 36 and a 1 is thus subtracted from the bin value therein. As long as no signal is detected by logic units 60 and 62, the bin value in unit 36 is unchanged. Initially all shift register bits may be preset to generate a reference bin value of 0 for each bin in any suitable manner.

After the last probe pulse $T_o$ of the correlation period, the comparator enable pulses are generated in sync with the clock pulses 80 to strobe gate 86 while the bin values are being compared in comparator 38 against the threshold value. When a bin value exceeds the threshold, its bin address as determined by bin counter 40 is loaded into the bin address memory 42. These bin addresses can be handed off to trackers to start tracking gates about the correlated targets. Such trackers are described in U.S. Pat. No. 3,803,604, previously mentioned. To avoid re-correlating targets before all other targets have been tracked, an address inhibit circuit in the form of a comparator 102 is used to inhibit storing bin addresses in the bin address memory 42 until the bin count in counter 40 has exceeded the last bin address stored in memory 42. If no targets are correlated, the memory 42 is reset to 0 in response to the output of delay 92 since flip-flop 90 will have been set by the last $T_o$ pulse but no exceedances from compartor output 84 will have occurred to reset flip-flop 90 through gates 86 and 88.

Thus, for the last $T_o$ probe signal that is transmitted during the correlation period, if no targets are received and identified by the system input 32, the delayed $T_o$ signal will reset the bin address memory 42 and the value in the memory will be thus zero manifesting the absence of any targets.

The arithmetic unit 36 may be implemented using either a binary full adder or an up/down counter. When using a full adder, the bin value 0 may be represented by binary 32, that is, 100000. Thus, binary values 32 to 63 would represent the positive bin values of 0 to 31 while 0 to 31 would represent the negative bin values of −32 to −1. Addition would then be accomplished by adding 1 to the bin value, while 1 may be subtracted by adding 31 (011111) to the bin value after inverting the most significant bit (MSB) of the bin value.

In implementing the arithmetic unit 36 by using a binary up/down counter, the bin value is loaded into the unit 36 after each shift register clock pulse (80) and at the end of each bin interval, unit 36 is either incremented 1 count, decremented 1 count, or left unaltered depending upon the status of the logic units 60 and 62.

The timing chart in FIG. 3 illustrates how during each of the 25 $T_o$ probes, ranges of several of the targets are identified on the continuous full range basis.

It will now be appreciated that in accordance with the full range correlator described, there is provided a means for identifying targets on a continuous basis by the correlation of target replies with the probe signals and discriminating from nontarget replies by the statistical processing of the signals. This is accomplished by the use of shift registers having the capacity of the desired range by appropriate selection of the shift register sizes and the clock rates of the system, each bin of range being predetermined in accordance with the desired length for each bin.

What is claimd is:

1. A circuit for correlating reply signals generated by remote stations in response to probe signals from interrogated stations, said reply signals being adapted to be received in an environment wherein signals of a type different from said replay signals may be received by said circuit, comprising the combination of:
   a. sequential storage means for storing a plurality of binary numbers includng accessing means for storing input numbers and retrieving output numbers;
   b. control means responsive to said reply signals and to said different signals for producing a first control signal in response to a reply signal and a second control signal in response to a different signal;
   c. adder means coupled to receive said output numbers and responsive to said first and second control signals for changing the value of said output numbers in response to said first and second control signals; and
   d. comparator means responsive to said output numbers and a reference number corresponding to minimum range for producing an output signal when said output number is equal to said input reference number.

2. A circuit according to claim 1 wherein said sequential storage means includes a plurality of shift registers, each register having a plurality of stages including an input and output stage and each stage adapted to store a binary logic bit signal,
   said registers being arranged so that corresponding stages of each of said registers is a storage stage for a respective bit of said binary number,
   clock means for clocking said registers and for sequentially transferring to said adder means a binary number stored in the output storage positions,
   the binary number in said adder means being transferred in response to said clock means to the corresponding input stages of said shift registers.

3. A circuit according to claim 2 wherein said comparator means includes probe counter means responsive to said probes for inhibiting said output signal upon counting a predetermined number of probes.

4. A circuit according to claim 3 including a shift register stage counter responsive to said clock means for counting the clocked stages of said shift registers and to inhibit further clocking of said shift registers after a predetermined clocking period.

5. A circuit according to claim 4 further including a shift register stage address memory means for enabling said output signal at the stage wherein said binary number is equal to said reference number.

6. In a cooperative collision avoidance system employing two distinctive type probe signals transmitted from an interrogation station, including remote stations having means to respond to said probe signals and to generate reply signals corresponding to the type of probe signal received,
   a. means responsive to said reply signals for generating a binary number representing the number of replies received during a predetermined period, said period corresponding to a range from said interrogation station to said remote stations,
   b. storage means for storing a plurality of said binary numbers,
   whereby the range of each reply received in response to a predetermined corresponding probe is stored in said storage means, and
   c. comparator means for comparing each of said binary numbers to a predetermined reference number corresponding to a minimum critical range and generating an output signal for each reply signal from a remote station having a range less than said critical range.

* * * * *